United States Patent
Malinen et al.

(10) Patent No.: US 10,460,378 B1
(45) Date of Patent: Oct. 29, 2019

(54) PAYMENT CARD POLICY ENFORCEMENT

(75) Inventors: Jari Malinen, Milpitas, CA (US); Vaduvur Bharghavan, Morgan Hill, CA (US); Sandeep Gilotra, Milpitas, CA (US); Jason Fieldman, Milpitas, CA (US); Rajinder Singh, Milpitas, CA (US); Rachna Ahlawat, Milpitas, CA (US); Kannan Konath, Milpitas, CA (US)

(73) Assignee: ONDOT SYSTEMS, INC., Milpitas, CA (US)

( * ) Notice: Subject to any disclaimer, the term of this patent is extended or adjusted under 35 U.S.C. 154(b) by 0 days.

(21) Appl. No.: 13/230,584

(22) Filed: Sep. 12, 2011

(51) Int. Cl.
*G06Q 40/00* (2012.01)
*G06Q 20/40* (2012.01)

(52) U.S. Cl.
CPC .............. *G06Q 40/00* (2013.01); *G06Q 20/40* (2013.01)

(58) Field of Classification Search
CPC .................................................. G06Q 20/409
USPC ............................................ 705/35, 40, 44
See application file for complete search history.

(56) References Cited

U.S. PATENT DOCUMENTS

| | | | |
|---|---|---|---|
| 5,708,422 A | 1/1998 | Blonder | |
| 5,884,289 A | 3/1999 | Anderson | |
| 5,953,710 A | 9/1999 | Fleming | |
| 6,029,154 A | 2/2000 | Pettitt | |
| 6,122,624 A | 9/2000 | Tetro | |
| 6,343,279 B1 | 1/2002 | Bissonette | |
| 6,422,462 B1 | 7/2002 | Cohen | |
| 6,516,056 B1 | 2/2003 | Justice | |
| 7,427,033 B1 | 9/2008 | Roskind | |
| 7,784,684 B2 | 8/2010 | Labrou et al. | |
| 7,793,851 B2 | 9/2010 | Mullen | |
| 7,798,416 B2 | 9/2010 | Roskind | |
| 7,801,826 B2 | 9/2010 | Labrou et al. | |
| 7,813,725 B2 | 10/2010 | Celik | |
| 7,822,688 B2 | 10/2010 | Labrou et al. | |
| 7,828,220 B2 | 11/2010 | Mullen | |
| 8,127,982 B1 | 3/2012 | Casey | |
| 8,706,620 B2 | 4/2014 | Ciurea | |

(Continued)

OTHER PUBLICATIONS

"Sniffing Tutorial part 1—intercepting Network Traffic", NETRESEC Network Security Blog. Web. , Mar. 11, 2011. http://www.netresec.com/?page=Blog&month=2011-03&post=Sniffing-Tutorial-part-1---Intercepting-Network-Traffic.

*Primary Examiner* — Ojo O Oyebisi
(74) *Attorney, Agent, or Firm* — Law Office of Dorian Cartwright; Dorian Cartwright

(57) ABSTRACT

Enforcing payment card policies using a financial institution agent coupled to a payment processing network. The advisory device intercepts messages directed to an authorization element at an authorizing bank, modifies the intercepted messages in response to a set of financial policy rules, and forwards the intercepted messages to the authorization element. The authorization element responds to any modifications made by the financial institution agent, and issues a grant or a denial of of authorization in response. The financial policy rules include a set of policy limits for use of the payment card, responsive to card usage type, merchant type and location, amount per transaction (or for a selected duration), number of transactions, and combinations thereof Financial policy rules can include side effects, including notifications or two-step authorization (with the cardholder or a monitoring party), transaction records, and combinations thereof.

2 Claims, 1 Drawing Sheet

(56) References Cited

U.S. PATENT DOCUMENTS

| | | |
|---|---|---|
| 9,324,105 B2 | 4/2016 | Kopikare |
| 2002/0035539 A1 | 3/2002 | O'Connell |
| 2002/0082995 A1 | 6/2002 | Christie, IV |
| 2002/0111886 A1* | 8/2002 | Chenevich et al. ............ 705/30 |
| 2002/0123938 A1 | 9/2002 | Yu |
| 2002/0152123 A1 | 10/2002 | Giordano et al. |
| 2002/0194141 A1 | 12/2002 | Langensteiner |
| 2002/0198806 A1 | 12/2002 | Blagg |
| 2003/0028481 A1 | 2/2003 | Flitcroft |
| 2003/0172040 A1* | 9/2003 | Kemper ................ G06Q 20/04 705/75 |
| 2004/0039694 A1 | 2/2004 | Dunn |
| 2004/0068653 A1 | 4/2004 | Fascenda |
| 2004/0128243 A1 | 7/2004 | Kavanagh |
| 2004/0203900 A1* | 10/2004 | Cedervall et al. ......... 455/456.1 |
| 2005/0097019 A1 | 5/2005 | Jacobs |
| 2005/0102243 A1 | 5/2005 | Kinsella |
| 2005/0240527 A1 | 10/2005 | Goldman |
| 2005/0268003 A1 | 12/2005 | Wang |
| 2006/0085337 A1* | 4/2006 | Conforti et al. ................ 705/40 |
| 2006/0178986 A1 | 8/2006 | Giordano et al. |
| 2007/0039049 A1 | 2/2007 | Kupferman et al. |
| 2007/0124256 A1 | 5/2007 | Crooks et al. |
| 2008/0101283 A1 | 5/2008 | Calhoun et al. |
| 2008/0120235 A1 | 5/2008 | Chu |
| 2008/0147523 A1 | 6/2008 | Mulry et al. |
| 2008/0228648 A1 | 9/2008 | Kemper |
| 2008/0257952 A1 | 10/2008 | Zandonadi |
| 2008/0263402 A1 | 10/2008 | Braysy |
| 2009/0112651 A1 | 4/2009 | Atkinson |
| 2009/0132424 A1 | 5/2009 | Kendrick et al. |
| 2009/0138968 A1 | 5/2009 | Serber |
| 2009/0164327 A1 | 6/2009 | Bishop et al. |
| 2009/0164330 A1 | 6/2009 | Bishop et al. |
| 2009/0254462 A1 | 10/2009 | Tomchek et al. |
| 2009/0313147 A1 | 12/2009 | Balasubramanian et al. |
| 2010/0051684 A1 | 3/2010 | Powers |
| 2010/0063903 A1 | 3/2010 | Whipple et al. |
| 2010/0106611 A1 | 4/2010 | Paulsen |
| 2010/0114776 A1 | 5/2010 | Weller et al. |
| 2010/0153224 A1 | 6/2010 | Livnat |
| 2010/0274720 A1 | 10/2010 | Carlson |
| 2010/0325047 A1 | 12/2010 | Carlson et al. |
| 2011/0238564 A1 | 9/2011 | Lim et al. |
| 2011/0251892 A1 | 10/2011 | Laracey |
| 2012/0030109 A1 | 2/2012 | Dooley Maley |
| 2012/0036013 A1 | 2/2012 | Neuhaus |
| 2012/0059758 A1 | 3/2012 | Carlson |
| 2012/0072347 A1 | 3/2012 | Conway |
| 2012/0095918 A1 | 4/2012 | Jurss |
| 2012/0143730 A1 | 6/2012 | Ansari et al. |
| 2012/0197708 A1* | 8/2012 | Mullen ............... G06Q 30/0207 705/14.35 |
| 2012/0197802 A1 | 8/2012 | Smith |
| 2012/0225639 A1 | 9/2012 | Gazdzinski |
| 2012/0271697 A1 | 10/2012 | Gilman |
| 2012/0303525 A1 | 11/2012 | Sahadevan |
| 2013/0138516 A1 | 5/2013 | White |
| 2013/0282593 A1 | 10/2013 | Merz et al. |
| 2013/0290121 A1 | 10/2013 | Simakov et al. |
| 2013/0332361 A1 | 12/2013 | Ciurea |
| 2013/0332362 A1 | 12/2013 | Ciurea |
| 2013/0346294 A1 | 12/2013 | Faith |
| 2014/0040135 A1 | 2/2014 | Ovick et al. |
| 2014/0095947 A1 | 4/2014 | Mozak |
| 2014/0258119 A1 | 9/2014 | Canis |
| 2014/0304055 A1 | 10/2014 | Faith |
| 2014/0358769 A1 | 12/2014 | Howe et al. |
| 2015/0242949 A1 | 8/2015 | Phillips, IV |

* cited by examiner

PAYMENT CARD POLICY ENFORCEMENT

BACKGROUND

Payment cards (including credit cards and debit cards) provide buyers with a way to conduct business with merchants without having to present cash or checks. To accept payment cards for goods and services, merchants send a message, typically from a point of sale (a "POS") to the merchant's own bank (the "acquiring bank") for approval of the payment card. The acquiring bank sends a message, typically an ISO 8583 message, to the bank which issued the payment card (the "authorizing bank"), asking for authorization of the transaction. The authorizing bank responds either with a grant or denial of authorization. Settlement of the transaction occurs using a different set of messages, which typically occurs at another time.

One problem with known systems is that the approval system at the authorizing bank is typically relatively inflexible. These approval systems are often limited to determining only if the payment cardholder (the buyer) has enough funds remaining to make the purchase. While it might be advantageous to modify the approval system at the authorizing bank, this would involve reprogramming the approval system, with a concomitant risk of error. Alternatively, while it might be advantageous to have the authorizing bank make a request for a more sophisticated authorization from an other device, this would involve integrating a new procedure into the approval system, again with a concomitant risk of error.

SUMMARY OF THE DESCRIPTION

We provide techniques that enforce payment card policies that are more flexible than currently available at authorizing banks. A financial institution agent coupled to a payment processing network intercepts messages directed to an authorization element at an authorizing bank. The financial institution agent modifies the intercepted messages in response to a set of financial policy rules. For example, the financial institution agent might insert an indicator into an intercepted message to the effect that the transaction should be denied. The authorization element at the authorizing bank responds to the modified message, and determines whether to grant or deny authorization in response to the modification. For example, if the financial institution agent tells the authorization element to issue a denial of authorization, the authorization element can deny authorization even if its own rules would otherwise issue a grant of authorization. The authorization element is not modified, eliminating any re-engineering risk. The authorization element also is not required to follow the financial institution agent's instructions; for example, the authorizing bank might decide to grant authorization in response to other factors, such as its own policies that promote cardholder satisfaction, or a human override.

In one embodiment, the financial policy rules include a set of policy limits for use of the payment card, responsive to multiple factors not available to the authorization element. The factors include card usage type, merchant type, merchant location, amount per transaction, number of transactions, and combinations thereof Financial policy rules can include side effects, including notifications or two-step authorization (with the cardholder or a monitoring party), and combinations thereof.

In one embodiment, the financial institution agent maintains a transaction record, available to the cardholder or a monitoring party, with the effect that the cardholder can readily determine if the payment card is lost, stolen, or misused by an otherwise authorized party.

DETAILED DESCRIPTION

TERMS AND PHRASES

Figure 1:
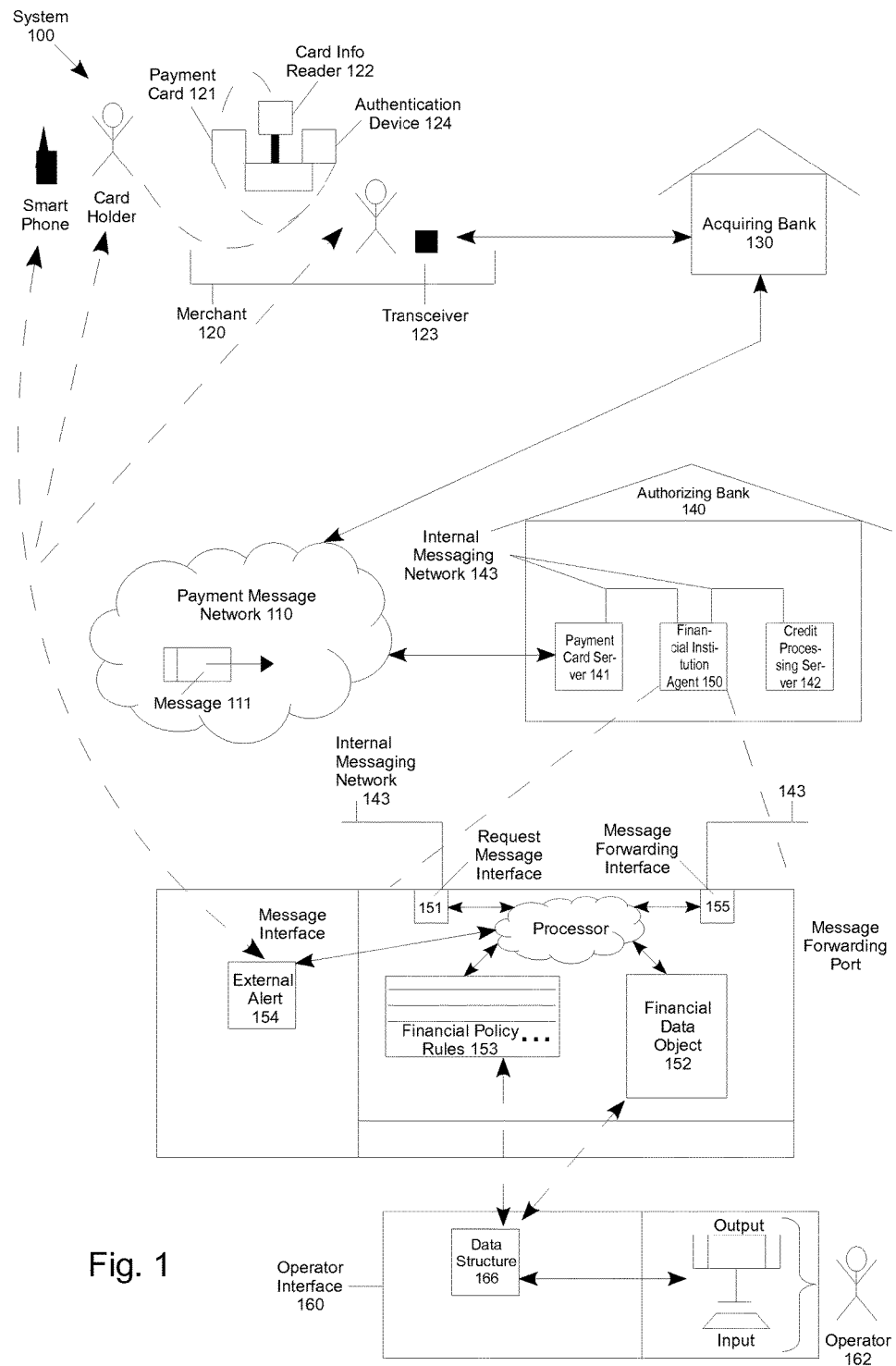
FIG. 1 shows a conceptual diagram of a payment processing system.

The following terms and phrases include their most general applicable form. Each is described in a manner that is illustrative, not limiting.

The phrase "company card", "company/employee card", "employee card", and variants thereof, generally describe when a payment card is associated with a company, but the actual cardholder is a company employee, such as for example a salesperson or another employee with business expenses. In such cases, company restrictions on use of the payment card by the employee are sometimes referred to herein as "company expense policies".

The phrases "one embodiment", "for example", and variants thereof, generally describe a possible embodiment or example as described, but not every embodiment or example need necessarily include all characteristics described for the embodiment or the example. Moreover, these phrases do not necessarily refer to the same embodiments or examples. When particular characteristics are described for any embodiment or example, it is within the knowledge of one of ordinary skill in the art to effect those particular characteristics, either in connection with other embodiments or examples, or otherwise, whether or not explicitly described.

The terms "cell phone", "client device", "smartphone", "web application", and variants thereof, generally describe any method of communication with a cardholder associated with a payment card. For a $1^{st}$ example, a smartphone might include a cellular phone disposed to receive messages such as SMS, email messages, or any type of push notification. For a $2^{nd}$ example, a web application might include a laptop, netbook, or other device disposed to receive chat notices or push notification, or to provide a cardholder with a relatively rapid technique for obtaining information about use of the payment card.

FIGURES AND TEXT

FIG. 1

FIG. 1 shows a conceptual diagram of a payment processing system.

Payment Processing System

A payment processing system 100 includes includes elements shown in the FIG. 1, including at least a payment message network 110, a merchant 120, an acquiring bank 130, an authorizing bank 140, a financial institution agent 150, and a operator interface 160.

The payment message network 110 includes a physical communication layer. The physical communication layer provides devices coupled to the system 100 the ability to send and receive messages 111. Those devices coupled to the system 100 include, as described below, at least the acquiring bank 130 and the authorizing bank 140. Those devices might possibly also include the merchant 120, the financial institution agent 150, or otherwise. In one embodiment, the payment message network 110 includes a packet switched network, including a subnetwork of switching elements. However, in the context of the invention, there is no particular requirement for any such limitation. In alternative embodiments, the network 110 might include any other form of communication techniques which provide for messages 111 (or even which provide for information not encapsulated in messages 111) to find their way from senders to destinations.

Messages 111 each include at least a source identifier, a destination identifier, a message type, and a set of message payload data. In one embodiment, messages 111 use the ISO 8385 standard for requesting payment card authorization and for receiving responses including either a grant or a denial of authorization. However, in the context of the invention, there is no particular requirement for any such limitation. In alternative embodiments, messages 111 might use a different standard, either a different published standard, or a private standard specific to the particular network 110. In systems 110 using the ISO 8385 standard, messages 111 might also include techniques for clearing and settlement of payment card transactions. Alternatively, clearing and settlement might be reserved for another time.

The merchant 120, sometimes referred to herein as a point of sale (POS), receives the payment card 121 (or in some cases, receives information identifying and authenticating the card 121), and includes a card information reader 122, a transceiver 123 coupled using the network 110 to the acquiring bank 130, and possibly other elements. For example, the POS 120 may include authorization devices 124 or other techniques which determine if the cardholder is in fact a person authorized to use the card 121. Authorization devices 124 could include signature recording devices (for making a record of the cardholder's handwritten signature), signature authorization devices (for verifying that the cardholder's signature is authentic), and otherwise.

In cases when the transaction occurs via phone or via the Internet, or otherwise when the payment case 121 is not physically present, the merchant receives information identifying and authenticating the card 121. This information would include the card number, its expiration date, and a CVV value (typically found printed on the back of the card, thus properly only available to someone physically looking at the payment card). This information might also include other authenticating information, such as for example a name of the cardholder, a zip code for a billing address associated with the payment card, or otherwise.

The merchant 120 sends information regarding the transaction in one or more messages 111 to the acquiring bank 130, including a merchant identifier, an amount, a type of card use (such as whether the card was physically present at the merchant, whether the transaction was phoned in, whether the transaction was entered using the Internet, or otherwise), and otherwise.

The acquiring bank 130 receives the one or more messages 111 from the merchant 120. The acquiring bank 130 sends one or more authorization request messages 111 to the authorizing bank 140. In one embodiment, those messages 111 include an ISO 8583 "0100" card authorization message or an ISO 8583 "0200" card authorization message. These messages 111 request the authorizing bank 140 to respond with a message indicating a grant or a denial of authorization. The payment message network 110 forwards the messages 111 to the authorizing bank 140.

Authorizing Bank

The authorizing bank 140 includes a payment card server 141, which receives authorization request messages 111, a credit processing server 142, which determines whether to issue a grant or a denial of authorization, and an internal messaging network 143.

The payment card server 141 validates those authorization request messages 111 that it receives. In one embodiment, validation includes whether the messages 111 are properly formatted, and whether they are directed to the correct authorizing bank 140. Once validated, the payment card server 141 forwards the messages 111 to the credit processing server 142.

The internal messaging network 143 provides communication between the payment card server 141 and the credit processing server 142. In one embodiment, the internal messaging network 143 includes a LAN, such as for example an Ethernet LAN, coupling the the payment card server 141 and the credit processing server 142. However, in the context of the invention, there is no requirement for any such limitation. For example, the payment card server 141 and the credit processing server 142 might communicate using a shared memory, or another technique.

The financial institution agent 150 is coupled to the internal messaging network 143 at the authorizing bank 140, in a manner that allows it to intercept messages 111 forwarded from the payment card server 141 to the credit processing server 142. In one embodiment, the financial institution agent 150 is coupled to the Ethernet LAN, and is capable of receiving the messages 111 and processing them before the credit processing server 142 is able to receive them. In one embodiment, the internal messaging network 143 is bifurcated into a first portion which is directly coupled to the payment card server 141, and a second portion which is directly coupled to the credit processing server 142, with the financial institution agent 150 spliced in at the connection between the first portion and the second portion of the internal messaging network 143. This has the effect that messages 111 between the payment card server 141 and the credit processing server 142 pass through the financial institution agent 150.

As described herein, the financial institution agent 150 reviews the messages 111, modifies them as appropriate, and forwards them to the credit processing server 142 for issue of a grant or a denial of authorization. When the credit processing server 142 has issued its response, such as for example an ISO 8583 "0210" message 111 indicating grant of authorization or an ISO 8583 message 111 indicating a denial of authorization, the financial institution agent 150 forwards the response message 111 from the credit processing server 142 to the payment card server 141 for its processing. The payment card server 141 forwards ISO 8583 messages 111 from the credit processing server 142 to the acquiring bank 130, which informs the merchant 120 whether the transaction has been approved or denied.

The credit processing server 142 receives the messages 111 after they have been possibly modified by the financial institution agent 150. The credit processing server 142 performs the acquiring bank's risk analysis of the request embodied by the ISO 8583 "0100" or "0200" message 111. The acquiring bank's risk analysis includes whether there are sufficient funds available to the cardholder (for example, when the payment card is a debit card, whether there are sufficient funds in the cardholder's account, or when the payment card is a credit card, whether there is sufficient credit remaining allowed to the cardholder for that payment card), whether customer service would indicate allowing the transaction (for example, if the transaction would only go a small amount over the credit remaining allowed for that payment card, and the cardholder has a reliable payment record), or otherwise.

Intercepted Messages

As described above, the financial institution agent 150 receives the messages 111 from the payment card server 141. The financial institution agent 150 includes a processor, program and data memory, mass storage, a request message interface 151, one or more financial data objects 152, a set of financial policy rules 153, an external alert element 154, and a message forwarding interface 155.

The request message interface 151 is coupled to the internal messaging network 143, with the effect that the financial institution agent 150 can receive ISO 8583 messages 111 from the payment card server 141. Alternatively, the financial institution agent 150 may receive the messages 111 using another interface. For some examples, the request message interface 151 may receive ISO 8583 messages 111 from the payment message network 110 without using the payment card server 141. The request message interface 151 may receive messages 111 from a TCP/IP network, having ISO 8583 messages 111 encapsulated within another protocol. The ISO 8583 messages 111 might be encapsulated within a TCP/IP protocol or a variant thereof, within an HTTP or HTTPS protocol or a variant thereof, or otherwise. While HTTP and HTTPS protocol messages are typically received at a designated port, the request message interface 151 may be coupled to a different port and the financial institution agent 150 may receive the messages 111 at that different port.

The request message interface 151 determines a type of ISO 8583 message 111 (such as for example, whether the ISO 8583 message 111 requests only authorization, or also requests clearing or settlement), and if appropriate, a version of the ISO 8583 protocol is used for the ISO 8583 messages 111. The request message interface 151 builds one or more financial data objects 152 in response to the ISO 8583 message 111, and forwards processing to the financial policy rules 153.

The processor at the financial institution agent 150 accesses the financial policy rules 153 and proceeds according to those rules. While this description includes embodiments in which the financial institution agent 150 maintains the financial policy rules 153, in the context of the invention, there is no particular requirement for this limitation. For example, the financial policy rules 153 might reside externally to the financial institution agent 150, but be accessible thereto. In one alternative embodiment, the financial policy rules 153 may reside at the operator interface 160, for relative ease of modification by an operator, but be accessible to the financial institution agent 150.

Upon processing according to the financial policy rules 153, the financial institution agent 150 modifies the ISO 8583 message 111, applies any designated side effects, and forwards the modified message 111 to the credit processing server 142. As described above, the credit processing server 142 receives the modified message 111, acts upon it, and issues a response message 111. The financial institution agent 150 receives the response message 111 and forwards it to the payment card server 141. The response message 111 proceeds to the acquiring bank 130 and to the merchant 120, with the effect that the transaction is approved or denied.

Modification of the ISO 8583 message 111 can include an indicator from the financial institution agent 150 to deny the request. This "note" would typically take the form of a deny-this-request bit (such as a "kill bit", which can be inserted into an ISO 8583 authorization request) that can be set in the request message 111. If so, the credit processing server 142 might, but is not required to, deny the request in response to that note from the financial institution agent 150, even if its own rules would otherwise indicate that it should issue approve the request. This has the effect that the financial institution agent 150, in response to the financial policy rules 153, advises the credit processing server 142 whether to issue a grant or denial of authorization. The financial policy rules 153 are more robust, more flexible, and more easily modifiable, than credit approval rules available to the credit processing server 142, with the effect that the credit processing server 142 has enhanced capability with the possibility of following the advice from the financial institution agent 150.

As noted above, the credit processing server 142 is not required to follow the advice provided by the financial institution agent 150. For example, the authorizing bank 140 might have a policy to approve particular transactions in response to other factors. For example, the authorizing bank 140 might approve all transactions lower than a selected amount (such as, say, $50.00), or to approve particular transactions that would promote cardholder satisfaction, or to approve selected transactions in response to a human override. In such cases, the credit processing server 142 would follow the policies determined by the authorizing bank 140, rather than the advice provided by the financial institution agent 150. This has the effect that even though the financial institution agent 150 provides its advice by modifying the ISO 8583 message 111, that advice is not mandatory.

Financial Policy Rules

In one embodiment, the financial institution agent 150 follows its financial policy rules 153 using a filtering agent which applies each rule in turn. As each financial policy rule 153 is applied, the financial institution agent 150 refers to the policy rule to determine if the policy rule states that the agent 150 should (1) modify the ISO 8583 message 111 to advise the authorizing bank 140 to issue a grant or a denial of authorization, (2) to execute a side effect, as possibly described below, and (3) to continue with the next policy rule or stop applying policy rules. In one embodiment, the filtering agent includes a Linux netfilter, ordinarily disposed to apply a set of rules to a set of incoming packets for firewalling or routing, repurposed to apply a set of rules to incoming messages 111 for approval or denial (and possible side effects).

As described above, the financial policy rules 153 include a set of policy limits for use of the payment card. The financial policy rules 153 are available for use by the financial institution agent 150, and for review and modification by an operator, as described below with respect to the operator interface 160. Reviewing and modifying the financial policy rules 153 by operators 162 has the effect that the authorizing bank 140 can debug, upgrade, or otherwise change the financial policy rules 153 as it deems necessary or convenient.

In one embodiment, the financial policy rules 153 are responsive to factors possibly not available to the credit processing server 142. The financial policy rules 153 are also responsive to combinations and conjunctions of those factors, as described by some examples below.

card usage type—This indicates whether the payment card was used in a transaction conducted in person, or was used in a transaction conducted via phone, was used in a transaction conducted via the Internet, is an automatic payment such as a monthly recurring charge, or otherwise. For example, a purchase of gasoline at a filling station would occur in person; any attempted transaction of that type conducted otherwise could be denied.

merchant type—This indicates which one of a set of categories into which the merchant 120 should be grouped. For a $1^{st}$ example, if the merchant 120 is an airline, hotel, or taxi, the merchant 120 might be categorized in a group relating to travel. For a $2^{nd}$ example, if the merchant 120 is a filling station, automotive repair shop or tire seller, the merchant 120 might be categorized in a group relating to automotive expenses.

In one embodiment, merchants 120 are grouped in categories in response to a need for determining whether the transaction is (1) possibly fraudulent, as described above with non in-person transactions for filling stations; (2) possibly outside the scope of the cardholder's authority. For example, for a company/employee card, the company might restrict use by the cardholder to selected classes of merchant.

merchant location—This indicates a geographic location for the merchant 120, such as for example as in a set of text describing a physical address. The system 100 might maintain a data structure associating the merchant location, or a portion thereof, with information indicating a centerpoint and accuracy, such as for example relating a zip code or a city name to a region of a map. This has the effect of facilitating a comparison of the merchant location with another location.

In cases where the transaction is conducted in person, the financial policy rule 153 might require two-step authorization, such as for example, requiring that the cardholder's cell phone is located, at the time of purchase, at the same location as the merchant 120. Two-step authorization is also described below with respect to side effects. In such cases, the merchant location is correlated with a location for the cardholder associated with the payment card, such as for example a location defined in response to a set of GPS coordinates (or cellular network information) describing a last known position of the cardholder's cell phone.

In cases where the merchant 120 has an address for billing which is distinct from its address for conducting business in person, such as when the merchant 120 includes a chain of distinct retail addresses, the merchant location might be included as a secondary address, or as a set of GPS coordinates or an IP address. In one embodiment, the system 100 can maintain a list of "inaccurate" merchant locations, with the effect that the financial institution agent 150 can disregard failed correlations between merchant location and cardholder location for those "inaccurate" merchant locations; for example, the system 100 can include machine learning, in response to non-disputes from cardholders, that such "inaccurate" merchant locations are distinct from actual retail addresses.

transaction amount—This indicates an amount (and currency denomination) of the transaction. In one embodiment, the financial policy rules 153 are also responsive to amount (and currency denomination) of the transaction for selected time periods. For a $1^{st}$ example, the financial policy rules 153 can limit the total amount of transactions on the same day, week, month, quarter, or year. For a $2^{nd}$ example, the financial policy rules 153 can limit the total amount of transactions during a particular period, such as for example a conference. With respect to total transaction amounts, the financial policy rules 153 can have a $1^{st}$ threshold when the transaction is regarded as suspect, and a $2^{nd}$ threshold when the transaction is regarded as improper.

number of transactions—This indicates a number of transactions made using the payment card. Similar to transaction amount, the financial policy rules 153 are also responsive to number of transactions for selected time periods. Similar to transaction amount, the financial policy rules 153 can have a $1^{st}$ threshold when the transaction is regarded as suspect, and a $2^{nd}$ threshold when the transaction is regarded as improper.

Side Effects

As described above, the financial policy rules 153 can include side effects, such as one or more of the following:

authorization—The financial institution agent 150 can attempt to obtain additional authorization of the cardholder after the transaction, with the possibility that the transaction could be later charged back, reversed or otherwise disputed.

This also includes asking the cardholder to further verify their assent to the transaction, such as for example correlating information about the transaction (such as for example, that the payment card was present for the transaction) with information about the cardholder (such as for example, a set of GPS coordinates or other location information about the cardholder's cell phone), or requesting that the cardholder use their cell phone to respond to a query from the financial institution agent 150 (after the fact of the transaction processing) asking if the transaction is in fact approved by the cardholder. These have the effect of providing additional assurance that the person presenting the card to the merchant 120 is the true cardholder, and has the effect of indicating that the true cardholder knows of and assents to the transaction. These effects occur after the transaction was already approved, but if the cardholder disputes the transaction, this provides the possibility of acting quickly on that dispute, and possibly later charging back or reversing the transaction or otherwise satisfying the cardholder and the authorizing bank 140.

Other and further forms of authorization, and of two-step authorization, are also possible.

notification—The financial institution agent 150 can notify the cardholder that the transaction is being conducted. This has the effect that the cardholder has an opportunity to inform the authorizing bank 140, or the financial institution agent 150, that the transaction is in fact authorized by the cardholder, or alternatively, is not being conducted by, and not approved by, the cardholder.

In one embodiment, where the payment card is a company/employee card, notification can include sending a message or a report (such as for example, an SMS or an email message, or another type of message) to a monitoring party, such as an accounting department at the company associated with the payment card. This has the effect that the monitoring party can obtain information about use of the payment card before the usual monthly statement, with the effect that the monitoring party can instruct the cardholder on company expense policies, or to generate an expense report.

As noted above, notification provides the opportunity for the cardholder (or another entity responsible for charges on the payment card) to later review transaction activity and possibly dispute one or more transactions, again with the possibility of later charging back or reversing the transaction, or otherwise satisfying the cardholder and the authorizing bank 140.

Meta-Rules

In one embodiment, the financial policy rules 153 can maintain state information about use of the payment card, with the effect that combinations and conjunctions of the rules 153 can be applied.

For a $1^{st}$ example, the financial policy rules 153 can maintain an indicator of how many suspect transactions have occurred in a recent time period, and can adjust the parameters for suspect transactions in response to that indicator. This would have the effect that one or more suspect transactions would reduce the limit for new transactions, rendering a new transaction deniable if it was preceded by too many suspect transactions.

For a $2^{nd}$ example, the financial policy rules 153 can maintain records of types of transactions, types of merchants, and their combinations (such as a cross-product of merchant type by transaction type), and determine, responsive to a threshold, whether an employee cardholder has been using the payment card for a particular type of purchase that is not within company expense policies.

Other and further examples of combinations of rules, with the effect of enforcing meta-rules, would be clear from these examples to those skilled in the art.

Transaction Record

In one embodiment, the financial institution agent 150 maintains a record of transactions, and makes that record available to the cardholder, or a monitoring party, via a secure web page or another technique for requesting and receiving that information. This has the effect that the cardholder or monitoring party can obtain information about use of the payment card before the usual monthly statement. For example, the cardholder or monitoring party can readily determine if the payment card is lost, stolen, or misused by an otherwise authorized party.

Operator Interface

The operator interface 160 includes a processor, program and data memory, mass storage, a set of input devices (such as for example a keyboard and a pointing device), a set of output devices (such as for example one or more displays and sets of speakers), and possibly a memory including a data structure such as a database 161. The operator interface 160 provides one or more operators 162 with access to the database 161, including the ability to review and modify data, subject to possible access control limitations. For example, access control can be applied to limit access to only selected operators, or only operators associated with selected institutions, or only operators given authorization by cardholders to review information with respect to those cardholders' accounts.

In one embodiment, the database 161 includes at least a copy of the financial policy rules 153, copies of any cardholder information necessary or convenient for review by operators 162 (such as for example contact information or target addresses for alert messages), and copies of any payment card information necessary or convenient for review by operators 162 (such as for example transaction information).

While this application primarily describes operators 162 including one or more persons, in the context of the invention, there is no particular requirement for any such limitation. Operators 162 might include one or more other entities, including without limitation, committees or other groups of persons acting in concert, software elements disposed for controlling or reporting on the database 161 or other performance of the payment processing system system 100, machine learning or other artificial intelligence systems, or otherwise.

The invention claimed is:

1. A computer-implemented method, in a card server device on a data communication network, for real-time verification by correlating transaction location reported within an authorization message requesting authorization of the transaction from an acquirer system over a first data path of the data communication network, to a mobile device location determined directly from the mobile device over a second data path distinct from the first data path, the method including steps of:

periodically updating location information of the mobile device received, at a network communication interface of the card server, over a second data path of the data communication network from the card server device to the mobile device;

receiving, at the network communication interface of the card server, the transaction location from within the authorization message by intercepting the authorization request message from the first data path, prior to authorization, as it is transmitted to an authorization processing server device within the acquirer system;

accessing, from a memory associated with the card server device, a set of transaction policy rules;

applying, by a processor of the card server device, the set of transaction policy rules determining approval or denial of the card authorization request message comprising:

recommending, in real-time, approval of the card authorization request for a cardholder associated with the transaction by correlating a transaction location with a latest location update for the mobile device associated with the cardholder, and recommending, in real-time, denial of the card authorization request for the cardholder associated with the transaction by failing to correlate the transaction location with the latest location update for the mobile device location associated with the cardholder, wherein the acquirer system incorporates the recommendation of the card server to make a final decision on authorization and transmits a modified version of a response to the card authorization request message to back to the transaction location.

2. The method of claim 1, wherein the step of modifying the card authorization request comprises adding a bit in an ISO (International Standards Organization) 8583 formatted message packet over the data communication network as a deny this request bit within the 8583 format message.

\* \* \* \* \*